(12) United States Patent
Kang et al.

(10) Patent No.: US 12,504,844 B2
(45) Date of Patent: Dec. 23, 2025

(54) ELECTRONIC DEVICE COMPRISING DISPLAY LAYER AND SENSOR LAYER

(71) Applicant: Samsung Display Co., Ltd., Yongin-si (KR)

(72) Inventors: Bongil Kang, Yongin-si (KR); Jun-Young Ko, Yongin-si (KR); Sangkook Kim, Yongin-si (KR); Taejoon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/988,157

(22) Filed: Dec. 19, 2024

(65) Prior Publication Data

US 2025/0238096 A1    Jul. 24, 2025

(30) Foreign Application Priority Data

Jan. 18, 2024    (KR) .................. 10-2024-0008107

(51) Int. Cl.
   *G06F 3/041* (2006.01)
   *G06F 3/044* (2006.01)
(52) U.S. Cl.
   CPC ........ *G06F 3/04164* (2019.05); *G06F 3/0446* (2019.05)
(58) Field of Classification Search
   CPC .. G06F 3/04164; G06F 3/0448; G06F 3/0412; G06F 3/0446
   See application file for complete search history.

(56) References Cited

U.S. PATENT DOCUMENTS

| 11,409,401 B2 | 8/2022 | Hyun et al. | |
| 11,573,671 B2 | 2/2023 | Hyun et al. | |
| 11,592,938 B2 | 2/2023 | Kim et al. | |
| 2020/0278765 A1* | 9/2020 | Chen | G06F 3/047 |
| 2022/0214770 A1* | 7/2022 | Bang | G06F 3/0448 |

FOREIGN PATENT DOCUMENTS

| CN | 112764590 A | 5/2021 |
| KR | 10-2020-0084496 A | 7/2020 |
| KR | 10-2022-0004895 A | 1/2022 |
| KR | 10-2022-0036419 A | 3/2022 |

\* cited by examiner

*Primary Examiner* — Deeprose Subedi
(74) *Attorney, Agent, or Firm* — Womble Bond Dickinson (US) LLP

(57) ABSTRACT

An electronic device includes a display layer, a sensor layer in which a sensing area including a first area and a second area spaced apart from the first area in a first direction are defined, and a sensor driver. The sensor layer includes a plurality of first-first electrodes, a plurality of second-first electrodes, a plurality of first-second electrodes, a plurality of second-second electrodes, a plurality of first lines, and a plurality of second lines. The plurality of first lines include a first sub-line connected with one of the plurality of first-first electrodes and one of the plurality of first-second electrodes and a second sub-line connected with another one of the plurality of first-first electrodes or another one of the plurality of first-second electrodes.

20 Claims, 12 Drawing Sheets

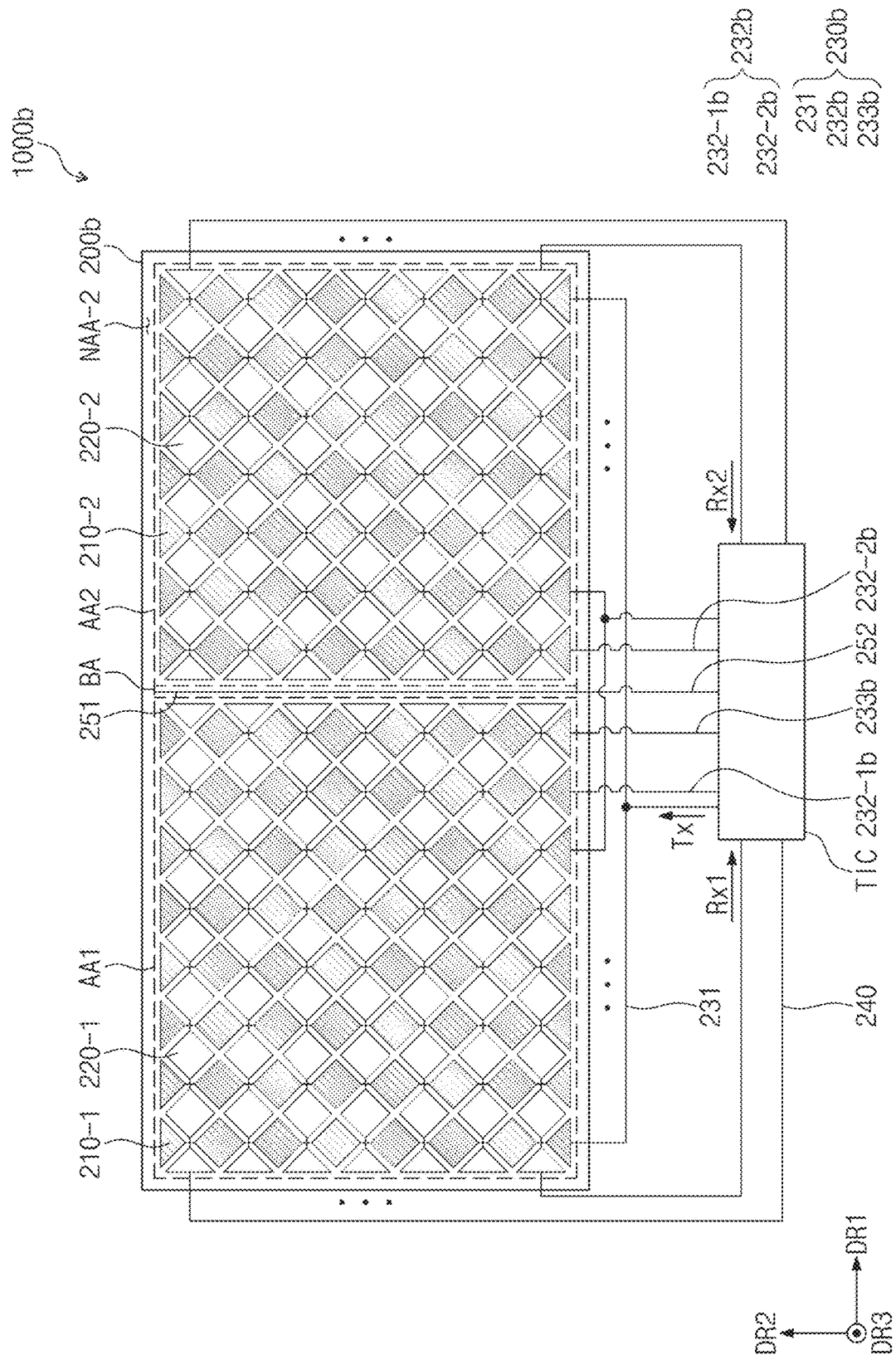

ELECTRONIC DEVICE COMPRISING DISPLAY LAYER AND SENSOR LAYER

CROSS-REFERENCE TO RELATED APPLICATION

The present application claims priority to and the benefit of Korean Patent Application No. 10-2024-0008107, filed on Jan. 18, 2024, in the Korean Intellectual Property Office, the entire disclosure of which is incorporated herein by reference.

BACKGROUND

1. Field

Aspects of some embodiments of the present disclosure relate to an electronic device with relatively improved touch reliability.

2. Description of the Related Art

Multimedia electronic devices, such as televisions, mobile phones, tablet computers, car navigation units, game machines, and the like, include an electronic device for displaying images. The electronic devices may include an input sensor capable of providing a touch-based input method that enables a user to intuitively input information or instructions in an easy and simple manner, in addition to conventional input methods such as a button, a keyboard, mouse, and the like.

The above information disclosed in this Background section is only for enhancement of understanding of the background and therefore the information discussed in this Background section does not necessarily constitute prior art.

SUMMARY

Aspects of some embodiments of the present disclosure include an electronic device with relatively improved touch reliability.

According to some embodiments, an electronic device includes a display layer, a sensor layer that is on the display layer and in which a sensing area including a first area and a second area spaced apart from the first area in a first direction is defined, and a sensor driver that drives the sensor layer. The sensor layer includes a plurality of first-first electrodes in the first area and arranged in the first direction, each of which extends in a second direction crossing the first direction, a plurality of second-first electrodes in the first area and arranged in the second direction, each of which extends in the first direction, a plurality of first-second electrodes in the second area and arranged in the first direction, each of which extends in the second direction, a plurality of second-second electrodes in the second area and arranged in the second direction, each of which extends in the first direction, a plurality of first lines connected with the plurality of first-first electrodes and the plurality of first-second electrodes, and a plurality of second lines connected with the plurality of second-first electrodes and the plurality of second-second electrodes. The plurality of first lines include a first sub-line connected with one of the plurality of first-first electrodes and one of the plurality of first-second electrodes and a second sub-line connected with another one of the plurality of first-first electrodes or another one of the plurality of first-second electrodes.

According to some embodiments, the plurality of first-first electrodes may cross the plurality of second-first electrodes while being insulated from the plurality of second-first electrodes, respectively, and the plurality of first-second electrodes may cross the plurality of second-second electrodes while being insulated from the plurality of second-second electrodes, respectively.

According to some embodiments, the first sub-line may include a plurality of first sub-lines, and the second sub-line may be between the plurality of first sub-lines.

According to some embodiments, the first sub-line may be connected to at least two electrodes among the plurality of first-first electrodes and the plurality of first-second electrodes, and the second sub-line may be connected to one electrode among the plurality of first-first electrodes and the plurality of first-second electrodes.

According to some embodiments, the sensing area may further include a boundary area between the first area and the second area, and the sensor layer may further include a guard electrode in the boundary area.

According to some embodiments, a ground voltage may be provided to the guard electrode.

According to some embodiments, the guard electrode may be in a floated state.

According to some embodiments, the second sub-line may be connected with an electrode adjacent to the guard electrode among the plurality of first-first electrodes and the plurality of first-second electrodes.

According to some embodiments, the plurality of first lines and the plurality of second lines may be electrically connected with the sensor driver.

According to some embodiments, the plurality of first lines may further include a third sub-line spaced apart from the first sub-line with the second sub-line therebetween.

According to some embodiments, the third sub-line may be connected with another one of the plurality of first-first electrodes and another one of the plurality of first-second electrodes.

According to some embodiments, the third sub-line may be connected with another one of the plurality of first-first electrodes or another one of the plurality of first-second electrodes.

According to some embodiments, the number of first lines connected to the first area may be different from the number of first lines connected to the second area.

According to some embodiments, an electronic device includes a display layer, a sensor layer that is on the display layer and in which a sensing area including a first area and a second area spaced apart from the first area in a first direction is defined, and a sensor driver that drives the sensor layer. The sensor layer includes a plurality of first electrodes in the first area and the second area, a plurality of second electrodes that are in the first area and the second area and that cross the plurality of first electrodes while being insulated from the plurality of first electrodes, respectively, a plurality of first sub-lines, each of which is connected with at least two first electrodes among the plurality of first electrodes, a plurality of second sub-lines, each of which is connected with one first electrode among the plurality of first electrodes, and a plurality of second lines electrically connected with the plurality of second electrodes, respectively.

According to some embodiments, each of the plurality of second sub-lines may be between the plurality of first sub-lines.

According to some embodiments, the sensing area may further include a boundary area between the first area and the second area, and the sensor layer may further include a guard electrode in the boundary area.

According to some embodiments, the plurality of second sub-lines may be connected with a first electrode adjacent to the guard electrode among the plurality of first electrodes.

According to some embodiments, the sensor layer may further include a third sub-line between the plurality of second sub-lines.

According to some embodiments, the third sub-line may be connected with first electrodes spaced apart from each other with the guard electrode therebetween among the plurality of first electrodes.

According to some embodiments, the third sub-line may be connected with one first electrode adjacent to the guard electrode among the plurality of first electrodes.

BRIEF DESCRIPTION OF THE DRAWINGS

The above and other aspects and features of the present disclosure will become apparent by describing in more detail aspects of some embodiments thereof with reference to the accompanying drawings.

FIG. 12 is a block diagram illustrating a part of an electronic device according to some embodiments of the present disclosure.

DETAILED DESCRIPTION

Figure 1:
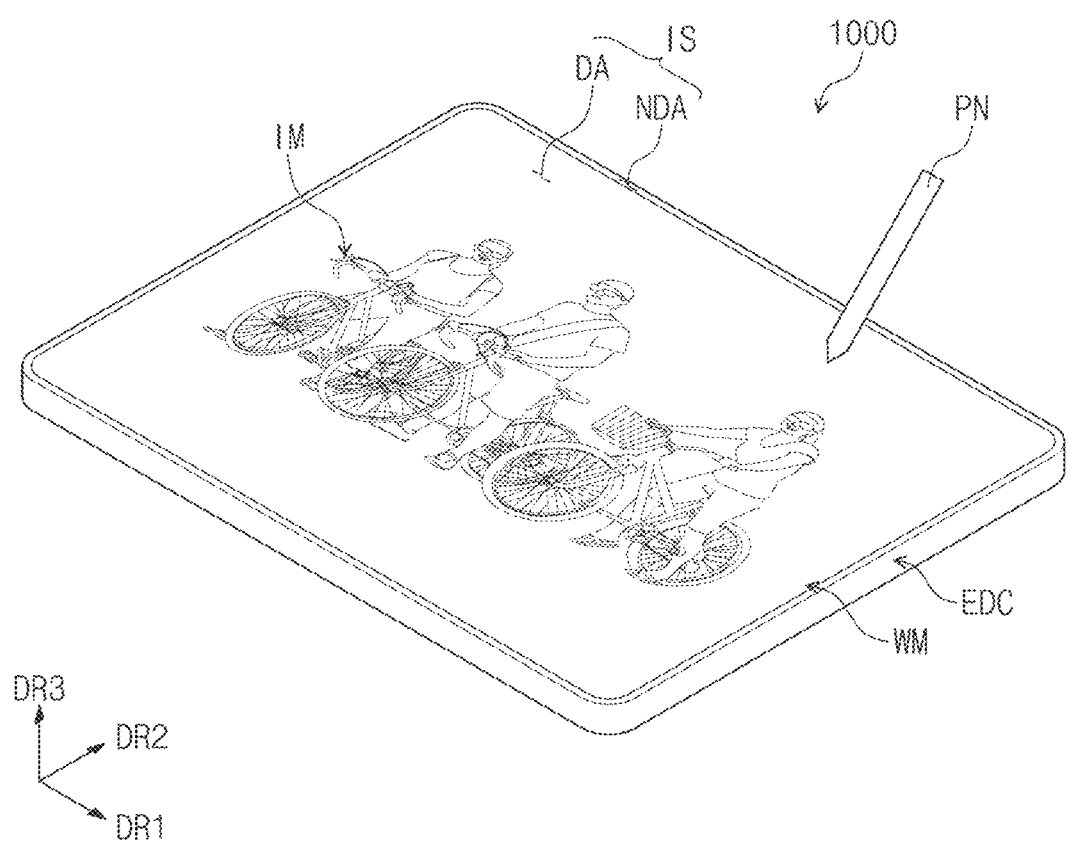
FIG. 1 is a perspective view of an electronic device according to some embodiments of the present disclosure.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, aspects of some embodiments of the present disclosure will be described with reference to the accompanying drawings.

Figure 2:
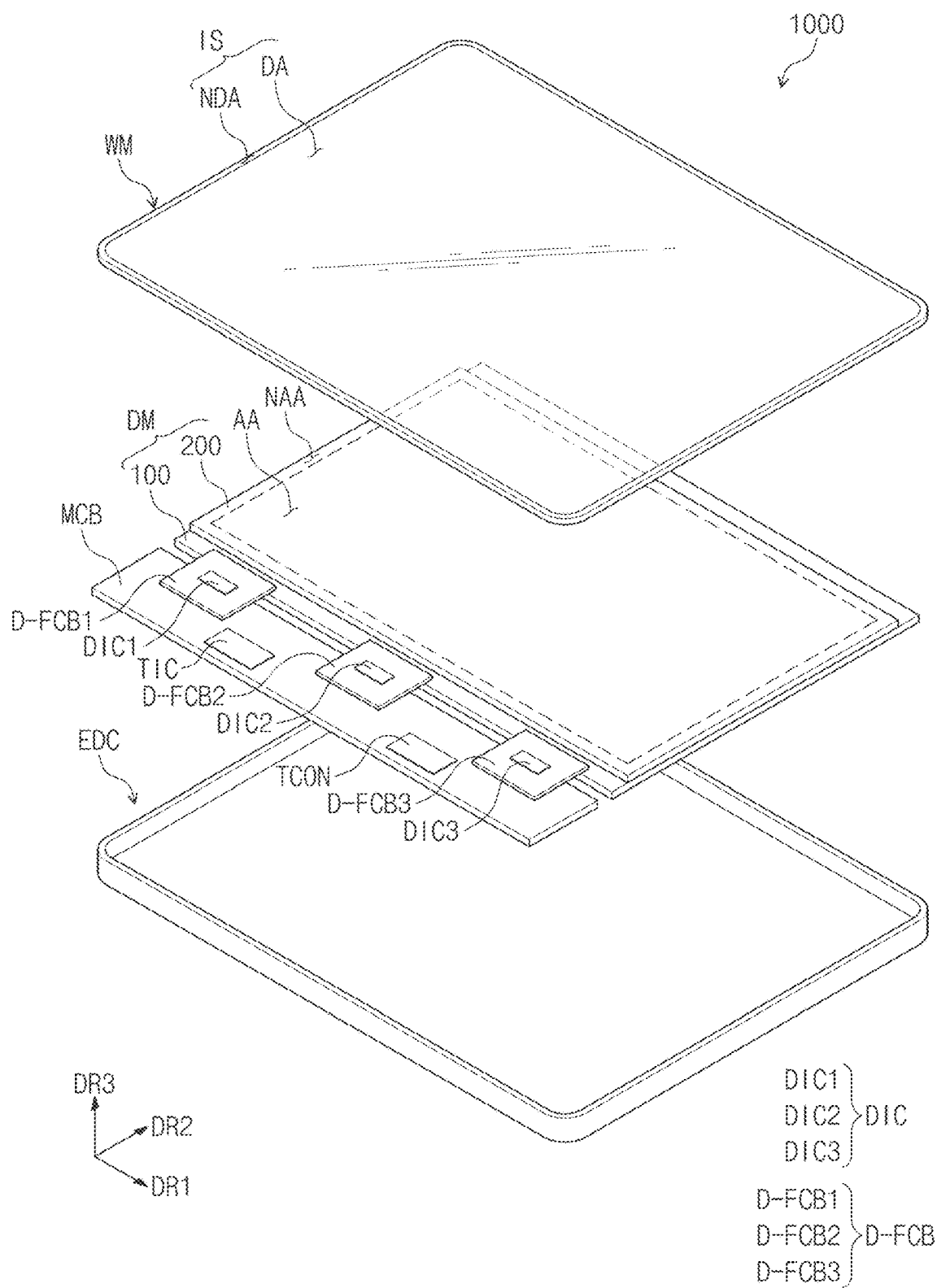
FIG. 2 is an exploded perspective view of the electronic device according to some embodiments of the present disclosure.

FIG. 1 is a perspective view of an electronic device according to some embodiments of the present disclosure, and FIG. 2 is an exploded perspective view of the electronic device according to some embodiments of the present disclosure.

Referring to FIGS. 1 and 2, the electronic device 1000 may be a device activated depending on an electrical signal. The electronic device 1000 according to the present disclosure may be a large electronic device such as a television, a monitor, or the like, or may be a small and medium-sized electronic device such as a mobile phone, a tablet computer, a notebook computer, a car navigation unit, a vehicle dashboard, a game machine, or the like. These electronic devices are merely illustrative, and the electronic device 1000 may include other forms of electronic devices without departing from the spirit and scope of embodiments according to the present disclosure. The electronic device 1000 may have a rectangular shape with long sides in a first direction DR1 and short sides in a second direction DR2 crossing the first direction DR1. However, without being limited thereto, the electronic device 1000 may have various shapes. The electronic device 1000 may display an image IM in a third direction DR3 on a display surface IS parallel to the first direction DR1 and the second direction DR2. The third direction DR3 may cross the first direction DR1 and the second direction DR2. The display surface IS, on which the image IM is displayed, may correspond to the front surface of the electronic device 1000.

In these embodiments, front surfaces (or, upper surfaces) and rear surfaces (or, lower surfaces) of members may be defined based on the direction in which the image IM is displayed. The front surfaces and the rear surfaces may be opposite each other in the third direction DR3, and the normal directions of the front surfaces and the rear surfaces may be parallel to the third direction DR3.

The separation distance between the front surface and the rear surface of the electronic device 1000 in the third direction DR3 may correspond to the thickness of the electronic device 1000 in the third direction DR3. Meanwhile, the directions indicated by the first to third directions DR1, DR2, and DR3 may be relative concepts and may be changed to other directions.

The electronic device 1000 may sense an external input applied from the outside. The external input may include various forms of inputs provided from outside the electronic device 1000. The electronic device 1000 according to some embodiments of the present disclosure may sense a user's external input applied from the outside. The user's external input may be one of various forms of external inputs, such as a part of the user's body, light, heat, gaze, and pressure, or a combination thereof. In addition, the electronic device 1000 may sense the user's external input applied to the side surface or the rear surface of the electronic device 1000 depending on the structure of the electronic device 1000 and is not limited to any one embodiment. According to some embodiments of the present disclosure, the external input may include an input by an input device PN. The input device PN may be referred to as a pen PN. For example, the pen PN may include a passive pen such as a stylus pen.

The display surface IS of the electronic device 1000 may be divided into a display area DA and a non-display area NDA. The display area DA may be an area on which the image IM is displayed. The user may visually recognize the image IM displayed at the display area DA. In these embodiments, the display area DA is illustrated as having a generally rectangular shape (e.g., with rounded corners). However, this is illustrative, and the display area DA may have various shapes and is not limited to any one embodiment (e.g., circular, elliptical, polygonal, irregular, etc.).

The non-display area NDA may be adjacent to the display area DA. The non-display area NDA may have a certain color. The non-display area NDA may surround the display area DA. Accordingly, the shape of the display area DA may be substantially defined by the non-display area NDA. However, this is illustrative, and the non-display area NDA may be located adjacent to only one side of the display area DA, or may be omitted. The electronic device 1000 according to some embodiments of the present disclosure may include various embodiments and is not limited to any one embodiment.

The electronic device 1000 may include a display module DM, a main circuit board MCB, flexible circuit films D-FCB, a plurality of data driving circuits DIC, and a window WM.

The display module DM may include a display layer 100 and a sensor layer 200.

The display layer 100 according to some embodiments of the present disclosure may be an emissive display panel. For example, the display layer 100 may be an organic light emitting display layer, an inorganic light emitting display layer, or a quantum-dot light emitting display layer. An emissive layer of the organic light emitting display layer may include an organic luminescent material. An emissive layer of the inorganic light emitting display layer may include an inorganic luminescent material. For example, the emissive layer of the inorganic light emitting display layer may include a micro LED or a nano LED. An emissive layer of the quantum-dot light emitting display layer may include quantum dots and quantum rods. Hereinafter, in these embodiments, it is illustrated that the display layer 100 is an organic light emitting display panel.

The display layer 100 may output the image IM, and the output image IM may be displayed through the display surface IS.

The sensor layer 200 may sense an external input. The sensor layer 200 may be located on the display layer 100. For example, the sensor layer 200 may be directly located on the display layer 100.

The window WM may be formed of a transparent material through which the image IM is able to be output. For example, the window WM may be formed of glass, sapphire, plastic, or the like. Although the window WM is illustrated as a single layer, the window WM is not limited thereto and may include a plurality of layers.

According to some embodiments, the window WM may include a light blocking pattern for defining the non-display area NDA. The light blocking pattern may be a colored organic film. For example, the light blocking pattern may be formed by coating.

The window WM may be coupled to the display module DM through an adhesive film. According to some embodiments of the present disclosure, the adhesive film may include an optically clear adhesive (OCA) film. However, without being limited thereto, the adhesive film may include a conventional adhesive or sticky substance. For example, the adhesive film may include an optically clear resin (OCR) or a pressure sensitive adhesive (PSA) film.

The display module DM may display the image IM in response to an electrical signal. The display module DM may have an effective area AA and an ineffective area NAA defined therein. The effective area AA may be defined as an area that outputs the image IM provided by display module DM.

The ineffective area NAA may be adjacent to the effective area AA. For example, the ineffective area NAA may surround the effective area AA. However, this is illustrative, and the ineffective area NAA may be defined in various shapes and is not limited to any one embodiment. According to some embodiments, the effective area AA of the display module DM may correspond to at least a portion of the display area DA.

The main circuit board MCB may be electrically connected with the display module DM through the flexible circuit films D-FCB. The flexible circuit films D-FCB may be connected to the display module DM and may electrically connect the display module DM and the main circuit board MCB.

The main circuit board MCB may include a sensor driver TIC and a timing controller TCON. The sensor driver TIC may include circuits for driving the display module DM. The plurality of data driving circuits DIC may be mounted on the flexible circuit films D-FCB, respectively.

According to some embodiments of the present disclosure, the flexible circuit films D-FCB may include a first flexible circuit film D-FCB1, a second flexible circuit film D-FCB2, and a third flexible circuit film D-FCB3.

The plurality of data driving circuits DIC may include a first data driving circuit DIC1, a second data driving circuit DIC2, and a third data driving circuit DIC3.

The first to third flexible circuit films D-FCB1, D-FCB2, and D-FCB3 may be spaced apart from one another in the first direction DR1 and may be connected to the display module DM to electrically connect the display module DM and the main circuit board MCB. The first data driving circuit DIC1 may be mounted on the first flexible circuit film D-FCB1. The second data driving circuit DIC2 may be mounted on the second flexible circuit film D-FCB2. The third data driving circuit DIC3 may be mounted on the third flexible circuit film D-FCB3. However, embodiments of the present disclosure are not limited thereto. For example, the display module DM may be electrically connected to the main circuit board MCB through one flexible circuit film, and only one driver IC may be mounted on the one flexible circuit film. Alternatively, the display module DM may be electrically connected to the main circuit board MCB through four or more flexible circuit films, and driver ICs may be mounted on the flexible circuit films, respectively.

Although FIG. 2 illustrates the structure in which the first to third data driving circuits DIC1, DIC2, and DIC3 are mounted on the first to third flexible circuit films D-FCB1, D-FCB2, and D-FCB3, respectively, the present disclosure is not limited thereto. For example, the first to third data driving circuits DIC1, DIC2, and DIC3 may be directly mounted on the display module DM. In this case, the portion of the display module DM on which the first to third data driving circuits DIC1, DIC2, and DIC3 are mounted may be bent and may be located on the rear surface of the display module DM. Alternatively, the first to third data driving circuits DIC1, DIC2, and DIC3 may be directly mounted on the main circuit board MCB.

The electronic device 1000 may further include an outer case EDC that accommodates the display module DM. The external case EDC may be coupled with the window WM and may define the exterior of the electronic device 1000. The outer case EDC may protect components accommodated in the external case EDC, by absorbing impact applied from the outside and preventing infiltration of foreign matter/moisture into the display module DM. Meanwhile, according to some embodiments of the present disclosure, the outer case EDC may be provided in a form in which a plurality of receiving members are combined.

The electronic device 1000 according to some embodiments may further include an electronic module including various functional modules for operating the display module DM, a power supply module (e.g., a battery) that supplies power required for overall operation of the electronic device 1000, and a bracket that is coupled with the display module DM and/or the external case EDC and that divides the inner space of the electronic device 1000.

Figure 3:
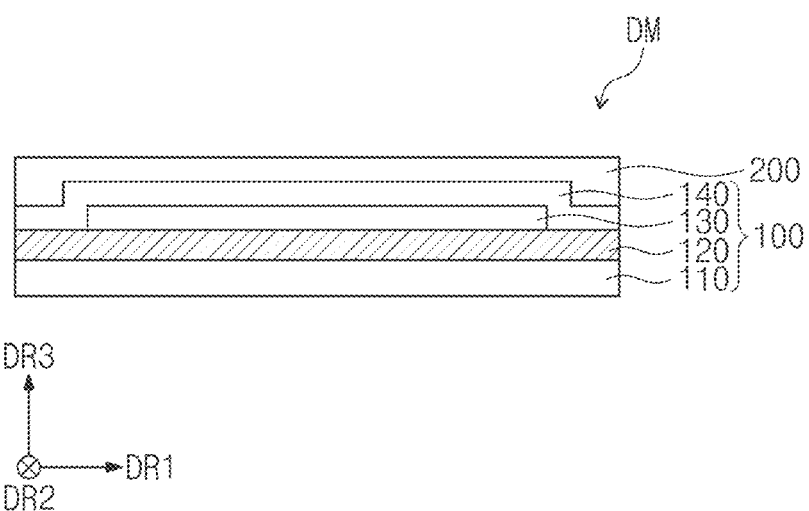
FIG. 3 is a schematic sectional view of a display module according to some embodiments of the present disclosure.

FIG. 3 is a schematic sectional view of the display module according to some embodiments of the present disclosure.

Referring to FIG. 3, the display module DM may include the display layer 100 and the sensor layer 200.

The display layer 100 may be a component that substantially generates an image. The display layer 100 may be an emissive display layer. For example, the display layer 100 may be an organic light emitting display layer, an inorganic light emitting display layer, an organic-inorganic light emitting display layer, a quantum-dot display layer, a micro-LED display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is located. The base layer 110 may have a multi-layer structure or a single-layer structure. The base layer 110 may be a glass substrate, a metal substrate, a silicon substrate, or a polymer substrate, but is not particularly limited thereto.

The circuit layer 120 may be located on the base layer 110. The circuit layer 120 may include an insulating layer, a semiconductor pattern, a conductive pattern, and a signal line. An insulating layer, a semiconductor layer, and a conductive layer may be formed on the base layer 110 by a process such as coating or deposition and may be selectively subjected to patterning by performing a photolithography process a plurality of times.

The light emitting element layer 130 may be located on the circuit layer 120. The light emitting element layer 130 may include light emitting elements. For example, the light emitting element layer 130 may include an organic luminescent material, an inorganic luminescent material, an organic-inorganic luminescent material, a quantum dot, a quantum rod, a micro LED, or a nano LED.

The encapsulation layer 140 may be located on the light emitting element layer 130. The encapsulation layer 140 may protect the light emitting element layer 130 from foreign matter such as moisture, oxygen, and dust particles.

The sensor layer 200 may be located on the display layer 100. The sensor layer 200 may sense an external input applied from the outside. The sensor layer 200 may be an integrated sensor continuously formed in a process of manufacturing the display layer 100. Alternatively, the sensor layer 200 may be an external sensor attached to the display layer 100. The sensor layer 200 may be referred to as a sensor, an input sensing layer, an input sensing panel, or an electronic device for sensing input coordinates.

Figure 4:
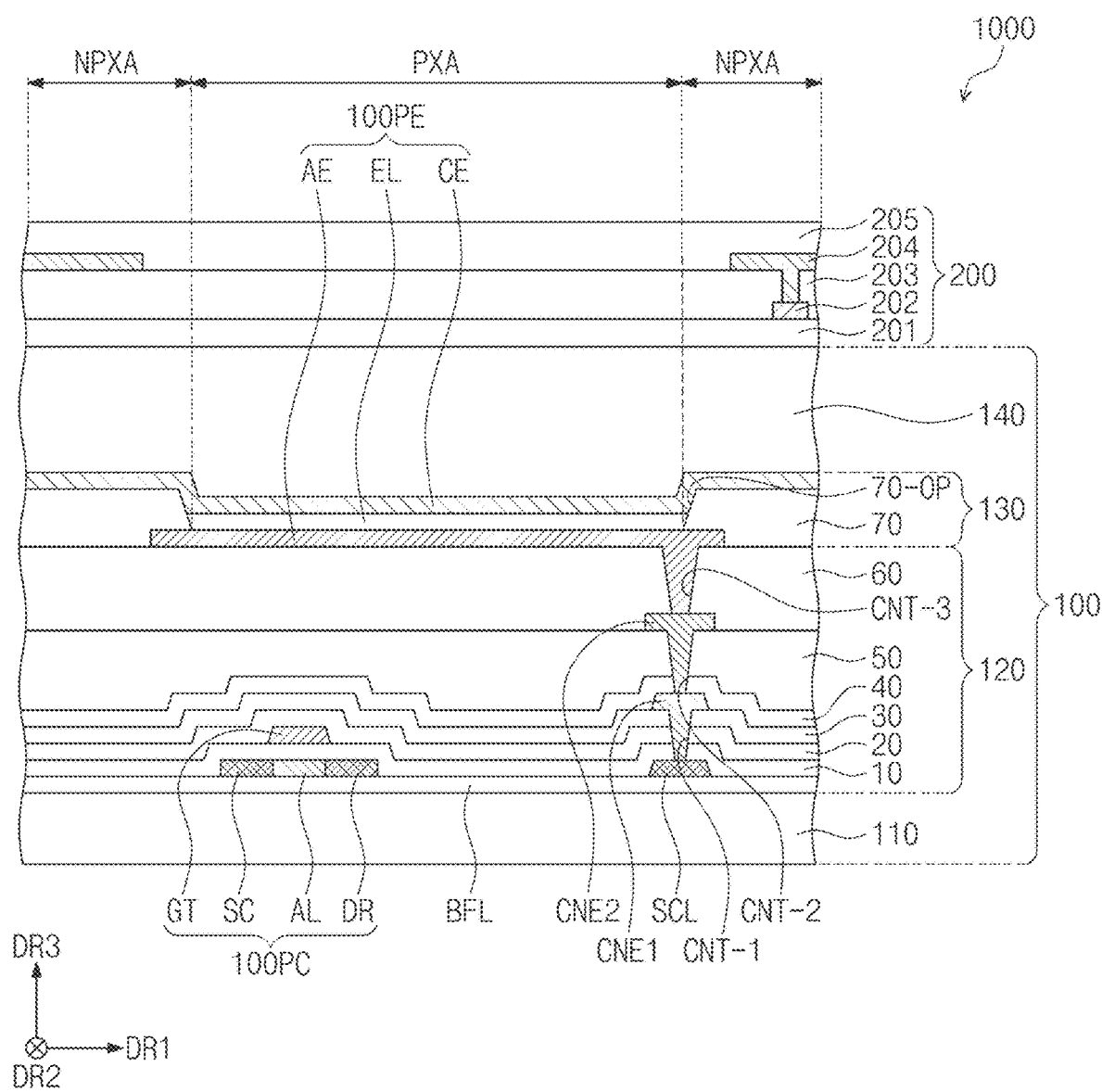
FIG. 4 is a sectional view of the electronic device according to some embodiments of the present disclosure.

FIG. 4 is a sectional view of the electronic device according to some embodiments of the present disclosure.

Referring to FIG. 4, at least one inorganic layer is formed on the upper surface of the base layer 110. The inorganic layer may include at least one of aluminum oxide, titanium oxide, silicon oxide, silicon nitride, silicon oxy nitride, zirconium oxide, or hafnium oxide. The inorganic layer may be formed of multiple layers. The multiple inorganic layers may constitute a barrier layer and/or a buffer layer. According to some embodiments, the display layer 100 is illustrated as including a buffer layer BFL.

The buffer layer BFL may improve the coupling force between the base layer 110 and a semiconductor pattern. The buffer layer BFL may include at least one of silicon oxide, silicon nitride, or silicon oxy nitride. For example, the buffer layer BFL may include a structure in which silicon oxide layers and silicon nitride layers are alternately stacked one above another.

The semiconductor pattern may be located on the buffer layer BFL. The semiconductor pattern may include poly silicon. However, without being limited thereto, the semiconductor pattern may include amorphous silicon, low-temperature polycrystalline silicon, or oxide semiconductor.

FIG. 4 illustrates only a portion of the semiconductor pattern, and the semiconductor pattern may be additionally located in other areas. The semiconductor pattern may be arranged across pixels according to a specific rule. The semiconductor pattern may have different electrical properties depending on whether doping is performed or not. The semiconductor pattern may include a first area having a high conductivity and a second area having a low conductivity. The first area may be doped with an N-type dopant or a P-type dopant. A P-type transistor may include a doped area that is doped with a P-type dopant, and an N-type transistor may include a doped area that is doped with an N-type dopant. The second area may be an un-doped area, or may be an area more lightly doped than the first area.

The first area may have a higher conductivity than the second area and may substantially serve as an electrode or a signal line. The second area may substantially correspond to an active (or, channel) area of a transistor. In other words, one portion of the semiconductor pattern may be the active area of the transistor, another portion may be a source or drain of the transistor, and the other portion may be a connecting electrode or a connecting signal line.

Each of the pixels may have an equivalent circuit including seven transistors, one capacitor, and a light emitting element, and the equivalent circuit of the pixel may be modified in various forms. In FIG. 4, one transistor 100PC and one light emitting element 100PE included in the pixel are illustrated as an example.

A source area SC, an active area AL, and a drain area DR of the transistor 100PC may be formed from the semiconductor pattern. The source area SC and the drain area DR may extend from the active area AL in opposite directions on the section. FIG. 4 illustrates a portion of a connecting signal line SCL formed from the semiconductor pattern. Although not separately illustrated, the connecting signal line SCL may be connected to the drain area DR of the transistor 100PC when viewed from above the plane.

A first insulating layer 10 may be located on the buffer layer BFL. The first insulating layer 10 may commonly overlap the plurality of pixels and may cover the semiconductor pattern. The first insulating layer 10 may be an inorganic layer and/or an organic layer and may have a single-layer structure or a multi-layer structure. The first insulating layer 10 may include at least one of aluminum oxide, titanium oxide, silicon oxide, silicon nitride, silicon oxy nitride, zirconium oxide, or hafnium oxide. According to some embodiments, the first insulating layer 10 may be a single silicon oxide layer. Not only the first insulating layer 10 but also insulating layers of the circuit layer 120 that will be described below may be inorganic layers and/or organic layers and may have a single-layer structure or a multi-layer structure. The inorganic layers may include at least one of the aforementioned materials, but are not limited thereto.

A gate GT of the transistor 100PC is located on the first insulating layer 10. The gate GT may be a portion of a metal pattern. The gate GT overlaps the active area AL. The gate GT may function as a mask in a process of doping the semiconductor pattern.

A second insulating layer 20 may be located on the first insulating layer 10 and may cover the gate GT. The second insulating layer 20 may commonly overlap the pixels. The second insulating layer 20 may be an inorganic layer and/or an organic layer and may have a single-layer structure or a multi-layer structure. The second insulating layer 20 may include at least one of silicon oxide, silicon nitride, or silicon oxy nitride. According to some embodiments, the second insulating layer 20 may have a multi-layer structure including a silicon oxide layer and a silicon nitride layer.

A third insulating layer 30 may be located on the second insulating layer 20. The third insulating layer 30 may have a single-layer structure or a multi-layer structure. For example, the third insulating layer 30 may have a multi-layer structure including a silicon oxide layer and a silicon nitride layer.

A first connecting electrode CNE1 may be located on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be located on the third insulating layer 30. The fourth insulating layer 40 may be a single silicon oxide layer. A fifth insulating layer 50 may be located on the fourth insulating layer 40. The fifth insulating layer 50 may be an organic layer.

A second connecting electrode CNE2 may be located on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be located on the fifth insulating layer 50 and may cover the second connecting electrode CNE2. The sixth insulating layer 60 may be an organic layer.

The light emitting element layer 130 may be located on the circuit layer 120. The light emitting element layer 130 may include the light emitting element 100PE. For example, the light emitting element layer 130 may include an organic luminescent material, an inorganic luminescent material, an organic-inorganic luminescent material, a quantum dot, a quantum rod, a micro LED, or a nano LED. Hereinafter, it will be exemplified that the light emitting element 100PE is an organic light emitting element. However, the present disclosure is not particularly limited thereto.

The light emitting element 100PE may include a first electrode AE, an emissive layer EL, and a second electrode CE.

The first electrode AE may be located on the sixth insulating layer 60. The first electrode AE may be connected to the second connecting electrode CNE2 through a contact hole CNT-3 penetrating the sixth insulating layer 60.

A pixel defining layer 70 may be located on the sixth insulating layer 60 and may cover a portion of the first electrode AE. The pixel defining layer 70 has an opening 70-OP defined therein. The opening 70-OP of the pixel defining layer 70 exposes at least a portion of the first electrode AE.

The display area DA (refer to FIG. 1) may include an emissive area PXA and a non-emissive area NPXA adjacent to the emissive area PXA. The non-emissive area NPXA may surround the emissive area PXA. According to some embodiments, the emissive area PXA is defined to correspond to a partial area of the first electrode AE exposed through the opening 70-OP.

The emissive layer EL may be located on the first electrode AE. The emissive layer EL may be located in an area corresponding to the opening 70-OP. That is, the emissive layer EL may be separately formed for each of the pixels. When the emissive layer EL is separately formed for each of the pixels, the emissive layers EL may each emit at least one of blue light, red light, or green light. However, without being limited thereto, the emissive layer EL may be connected to the pixels and may be commonly provided. In this case, the emissive layer EL may provide blue light or white light.

The second electrode CE may be located on the emissive layer EL. The second electrode CE may have a one-body shape and may be commonly arranged for the plurality of pixels.

According to some embodiments, a hole control layer may be located between the first electrode AE and the emissive layer EL. The hole control layer may be commonly arranged in the emissive area PXA and the non-emissive area NPXA. The hole control layer may include a hole transport layer and may further include a hole injection layer. An electron control layer may be located between the emissive layer EL and the second electrode CE. The electron control layer may include an electron transport layer and may further include an electron injection layer. The hole control layer and the electron control layer may be commonly formed for the plurality of pixels using an open mask.

The encapsulation layer 140 may be located on the light emitting element layer 130. The encapsulation layer 140 may include an inorganic layer, an organic layer, and an inorganic layer that are sequentially stacked one above another. However, layers constituting the encapsulation layer 140 are not limited thereto. The inorganic layers may protect the light emitting element layer 130 from moisture and oxygen, and the organic layer may protect the light emitting element layer 130 from foreign matter such as dust particles. The inorganic layers may include a silicon nitride layer, a silicon oxy nitride layer, a silicon oxide layer, a titanium oxide layer, or an aluminum oxide layer. The organic layer may include an acrylic organic layer, but is not limited thereto.

The sensor layer 200 may include a base layer 201, a first conductive layer 202, a sensing insulation layer 203, a second conductive layer 204, and a cover insulation layer 205.

The base layer 201 may be an inorganic layer including at least one of silicon nitride, silicon oxy nitride, or silicon oxide. Alternatively, the base layer 201 may be an organic layer including an epoxy resin, an acrylic resin, or an imide-based resin. The base layer 201 may have a single-layer structure, or may have a multi-layer structure stacked in the third direction DR3.

Each of the first conductive layer 202 and the second conductive layer 204 may have a single-layer structure, or may have a multi-layer structure stacked in the third direction DR3.

A conductive layer having a single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), indium zinc tin oxide (IZTO), or the like. In addition, the transparent conductive layer may include a conductive polymer such as PEDOT, a metal nano-wire, or graphene.

A conductive layer having a multi-layer structure may include metal layers. The meal layers may have, for example, a three-layer structure of titanium/aluminum/titanium. The conductive layer having the multi-layer structure may include at least one metal layer and at least one transparent conductive layer.

At least one of the sensing insulation layer 203 or the cover insulation layer 205 may include an inorganic film. The inorganic film may include at least one of aluminum oxide, titanium oxide, silicon oxide, silicon nitride, silicon oxy nitride, zirconium oxide, or hafnium oxide.

At least one of the sensing insulation layer 203 and the cover insulation layer 205 may include an organic film. The organic film may include at least one of an acrylic resin, a methacrylic resin, a polyisoprene resin, a vinyl resin, an epoxy resin, a urethane-based resin, a celluosic resin, a siloxane-based resin, a polyimide resin, a polyamide resin, or a perylene-based resin.

Figure 5:
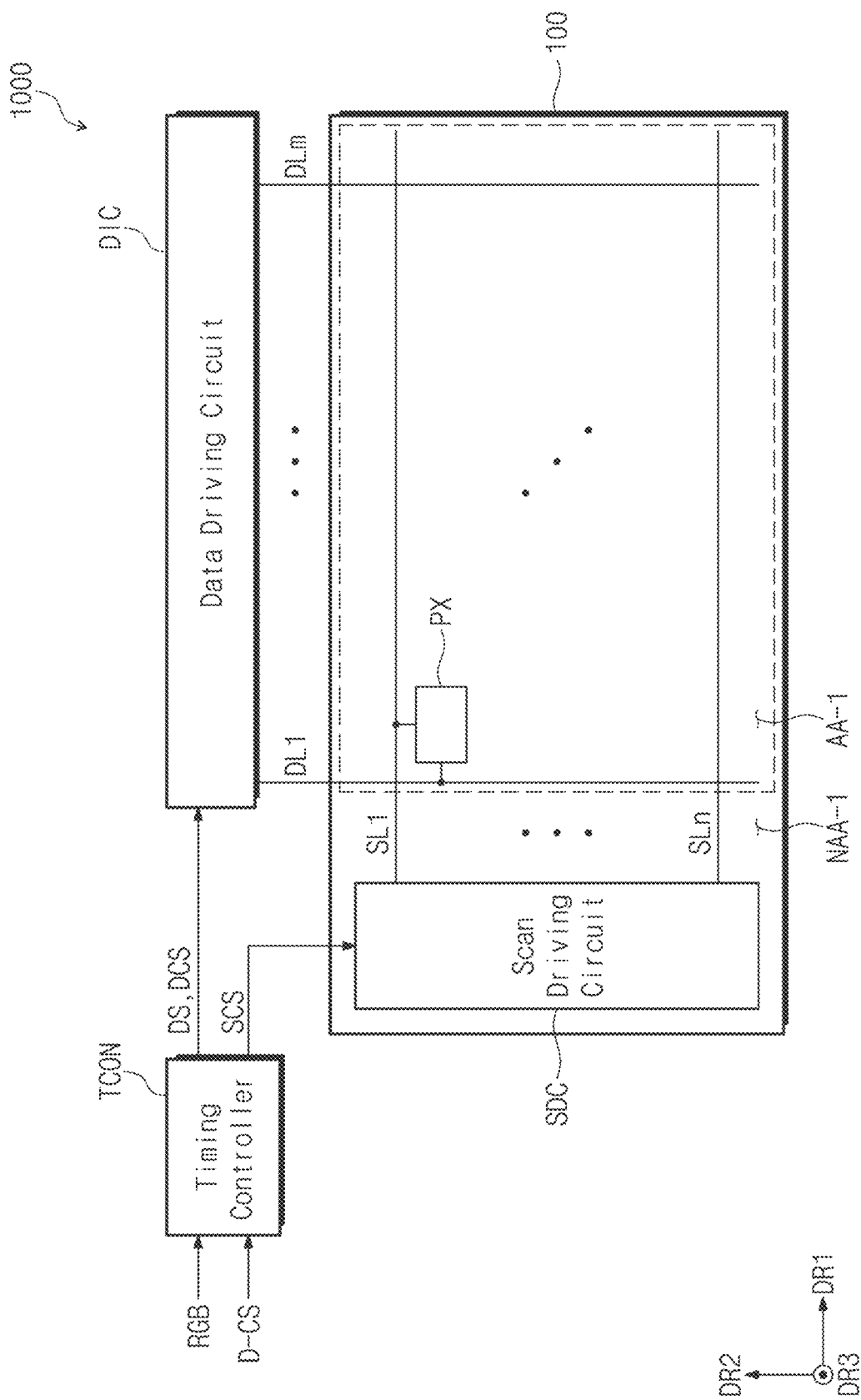
FIG. 5 is a block diagram illustrating a part of the electronic device according to some embodiments of the present disclosure.

FIG. 5 is a block diagram illustrating a part of the electronic device according to some embodiments of the present disclosure.

Referring to FIG. 5, the electronic device 1000 may include the display layer 100, the timing controller TCON, and a data driving circuit DIC. The data driving circuit DIC of FIG. 5 may be one of the data driving circuits DIC (refer to FIG. 2) that are illustrated in FIG. 2.

The timing controller TCON may receive input data RGB and a control signal D-CS from a processor. The processor may include a graphic processing unit. The control signal D-CS may include various signals. For example, the control signal D-CS may include an input vertical synchronization signal, an input horizontal synchronization signal, a main clock, and a data enable signal.

The timing controller TCON may generate image data DS by converting the data format of the input data RGB according to the specification of an interface with the data driving circuit DIC.

The timing controller TCON may generate a scan control signal SCS and a data control signal DCS, based on the control signal D-CS.

In response to the data control signal DCS and the image data DS from the timing controller TCON, the data driving circuit DIC may output gray voltages for driving a plurality of data lines DL1 to DLm. The data driving circuit DIC may be implemented with an integrated circuit. The data driving circuit DIC may be directly mounted on a certain area of the display layer 100. Alternatively, the data driving circuit DIC may be mounted on a separate printed circuit board in a chip on film (COF) manner and may be electrically connected with the display layer 100. However, the present disclosure is not particularly limited. For example, the data driving circuit DIC may be formed through the same process as the circuit layer in the display layer 100.

A display area AA-1 and a non-display area NAA-1 may be defined in the display layer 100. The plurality of pixels PX may be located in the display area AA-1, and a scan driving circuit SDC may be located in the non-display area NAA-1. The display area AA-1 may overlap the effective area AA (refer to FIG. 2) of the electronic device 1000, and the non-display area NAA-1 may overlap the ineffective area NAA (refer to FIG. 2) of the electronic device 1000.

The display layer 100 may include a plurality of scan lines SL1 to SLn, the plurality of data lines DL1 to DLm, the plurality of pixels PX, and the scan driving circuit SDC. Each of the plurality of pixels PX may be connected with a corresponding data line among the plurality of data lines DL1 to DLm and may be connected with a corresponding scan line among the plurality of scan lines SL1 to SLn. According to some embodiments of the present disclosure, the display layer 100 may further include light emission control lines, and the electronic device 1000 may further include a light emission driving circuit that provides control signals to the light emission control lines. The configuration of the display layer 100 is not particularly limited.

Each of the plurality of scan lines SL1 to SLn may extend parallel to the first direction DR1. The plurality of scan lines SL1 to SLn may be arranged in the second direction DR2 so as to be spaced apart from one another. Each of the plurality of data lines DL1 to DLm may extend from the data driving circuit DIC in the second direction DR2. The plurality of data lines DL1 to DLm may be arranged in the first direction DR1 so as to be spaced apart from one another.

The plurality of pixels PX may be electrically connected to the plurality of scan lines SL1 to SLn and the plurality of data lines DL1 to DLm, respectively. For example, the pixels in the first row may be connected to the scan line SL1, and the pixels in the first column may be connected to the data line DL1.

The scan driving circuit SDC may drive the plurality of scan lines SL1 to SLn in response to the scan control signal SCS. According to some embodiments of the present disclosure, the scan driving circuit SDC may be formed through the same process as the circuit layer in the display layer 100, but is not limited thereto. For example, the scan driving circuit SDC may be implemented with an integrated circuit (IC). The scan driving circuit SDC may be directly mounted on a certain area of the display layer 100. Alternatively, the scan driving circuit SDC may be mounted on a separate printed circuit board in a chip on film (COF) manner and may be electrically connected with the display layer 100.

Figure 6:
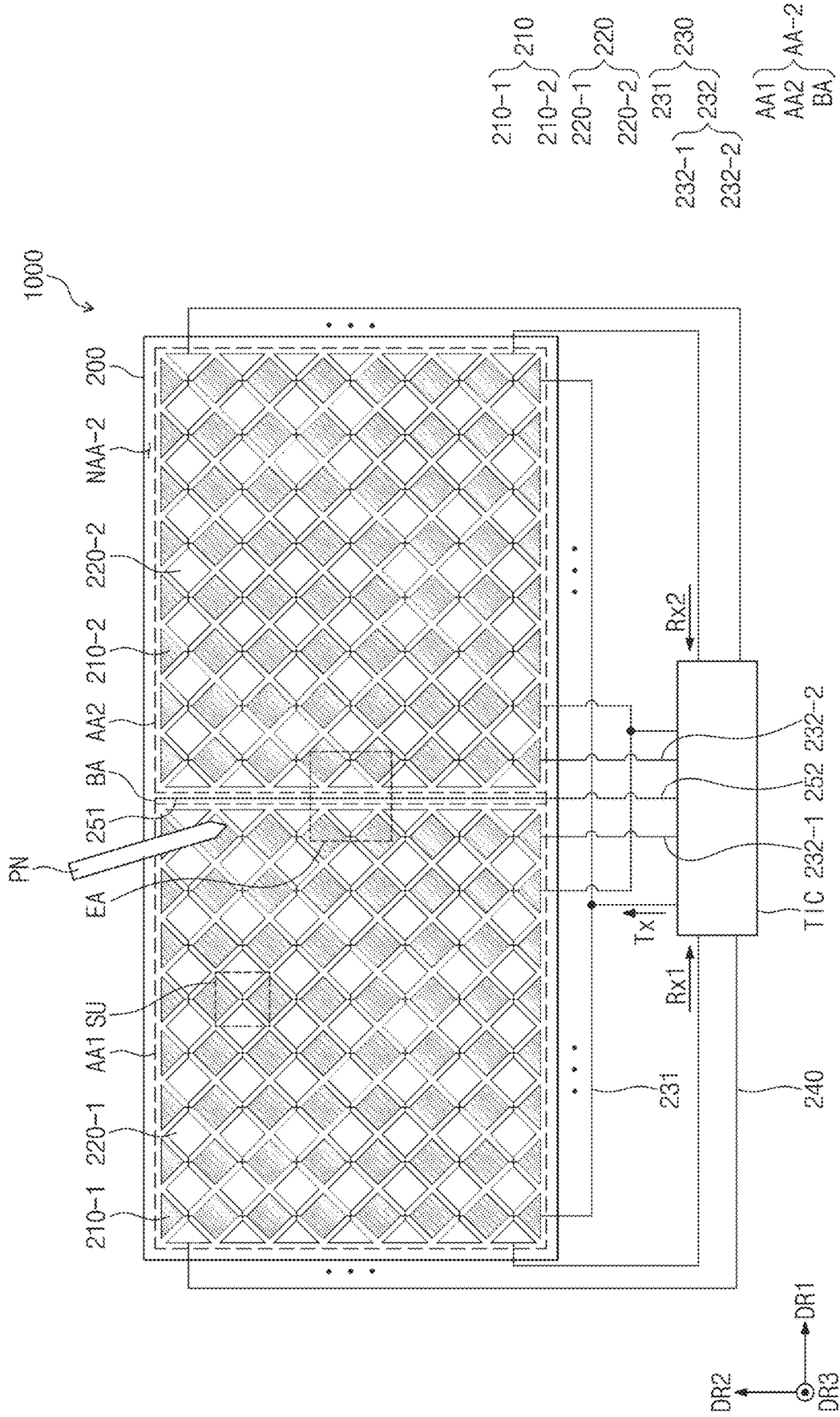
FIG. 6 is a block diagram illustrating a part of the electronic device according to some embodiments of the present disclosure.

FIG. 6 is a block diagram illustrating a part of the electronic device according to some embodiments of the present disclosure.

Referring to FIG. 6, the electronic device 1000 may include the sensor layer 200 and the sensor driver TIC.

A sensing area AA-2 and a peripheral area NAA-2 may be defined in the sensor layer 200. The sensing area AA-2 may be an area activated depending on an electrical signal. The sensing area AA-2 may be an area that senses an input. The sensing area AA-2 may overlap the effective area AA (refer to FIG. 2) of the electronic device 1000 and may overlap the display area AA-1 (refer to FIG. 5) of the display layer 100 (refer to FIG. 5). The peripheral area NAA-2 may be adjacent to the sensing area AA-2. The peripheral area NAA-2 may overlap the ineffective area NAA (refer to FIG. 2) of the electronic device 1000 and may overlap the non-display area NAA-1 (refer to FIG. 5) of the display layer 100 (refer to FIG. 5).

The sensing area AA-2 may include a first area AA1, a second area AA2, and a boundary area BA. The second area AA2 may be spaced apart from the first area AA1 in the first direction DR1. The boundary area BA may be located between the first area AA1 and the second area AA2.

The sensor layer 200 may include a plurality of electrodes 210 and 220, a plurality of first lines 230, a plurality of second lines 240, a guard electrode 251, and a guard line 252. The plurality of electrodes 210 and the guard electrode 251 may be located in the sensing area AA-2.

The sensor layer 200 may include the plurality of first electrodes 210 and the plurality of second electrodes 220. The sensor layer 200 may obtain information about an external input through a change in the capacitance between the plurality of first electrodes 210 and the plurality of second electrodes 220.

The plurality of first electrodes 210 may include a plurality of first-first electrodes 210-1 and a plurality of first-second electrodes 210-2.

The plurality of first-first electrodes 210-1 may be located in the first area AA1. The plurality of first-first electrodes 210-1 may be arranged in the first direction DR1. Each of the plurality of first-first electrodes 210-1 may extend in the second direction DR2.

The plurality of first-second electrodes 210-2 may be located in the second area AA2. The plurality of first-second electrodes 210-2 may be arranged in the first direction DR1. Each of the plurality of first-second electrodes 210-2 may extend in the second direction DR2.

Although eight first-first electrodes 210-1 and eight first-second electrodes 210-2 are illustrated in FIG. 6 as an example, the number of first-first electrodes 210-1 and the number of first-second electrodes 210-2 according to some embodiments of the present disclosure are not limited thereto. For example, the number of first-first electrodes 210-1 and the number of first-second electrodes 210-2 may each be 36.

The plurality of second electrodes 220 may include a plurality of second-first electrodes 220-1 and a plurality of second-second electrodes 220-2.

The plurality of second-first electrodes 220-1 may be located in the first area AA1. The plurality of second-first electrodes 220-1 may be arranged in the second direction DR2. Each of the plurality of second-first electrodes 220-1 may extend in the first direction DR1. The plurality of second-first electrodes 220-1 may be insulated from the plurality of first-first electrodes 210-1 and may cross the plurality of first-first electrodes 210-1.

The plurality of second-second electrodes 220-2 may be located in the second area AA2. The plurality of second-second electrodes 220-2 may be arranged in the second direction DR2. Each of the plurality of second-second electrodes 220-2 may extend in the first direction DR1. The plurality of second-second electrodes 220-2 may be insulated from the plurality of first-second electrodes 210-2 and may cross the plurality of first-second electrodes 210-2.

Although seven second-first electrodes 220-1 and seven second-second electrodes 220-2 are illustrated in FIG. 6 as an example, the number of second-first electrodes 220-1 and the number of second-second electrodes 220-2 according to some embodiments of the present disclosure are not limited thereto. For example, the number of second-first electrodes 220-1 and the number of second-second electrodes 220-2 may each be 40.

The plurality of first lines 230 may be electrically connected with the sensor driver TIC. The plurality of first lines 230 may be located in the peripheral area NAA-2. The plurality of first lines 230 may be electrically connected with the plurality of first-first electrodes 210-1 and the plurality of first-second electrodes 210-2.

The plurality of first lines 230 may include a plurality of first sub-lines 231 and a plurality of second sub-lines 232.

Each of the plurality of first sub-lines 231 may be connected with a corresponding one of the plurality of first-first electrodes 210-1 and a corresponding one of the plurality of first-second electrodes 210-2. That is, one first sub-line 231 may be connected with two first electrodes 210. For example, the first first sub-line 231 may be connected with the first first-first electrode 210-1 and the eighth first-second electrode 210-2, and the last first sub-line 231 may be connected with the seventh first-first electrode 210-1 and the second first-second electrode 210-2.

The plurality of first-first electrodes 210-1 and the plurality of first-second electrodes 210-2 may be electrically connected by the plurality of first sub-lines 231. Each of the plurality of first sub-lines 231 may be connected to at least two electrodes among the plurality of first-first electrodes 210-1 and the plurality of first-second electrodes 210-2.

The plurality of second sub-lines 232 may be located between the plurality of first sub-lines 231. Each of the plurality of second sub-lines 232 may be connected with one of the plurality of first-first electrodes 210-1 or one of the plurality of first-second electrodes 210-2. Each of the plurality of second sub-lines 232 may be connected to one electrode among the plurality of first-first electrodes 210-1 and the plurality of first-second electrodes 210-2.

Each of the plurality of second sub-lines 232 may be connected with a first electrode adjacent to the boundary area BA among the plurality of first electrodes 210. For example, each of the plurality of second sub-lines 232 may be connected to an electrode adjacent to the guard electrode 251 among the plurality of first-first electrodes 210-1 and the plurality of first-second electrodes 210-2.

The plurality of second sub-lines 232 may include a second-first sub-line 232-1 and a second-second sub-line 232-2.

The second-first sub-line 232-1 may be connected with one of the plurality of first-first electrodes 210-1 located in the first area AA1. The second-first sub-line 232-1 may be connected with the last first-first electrode 210-1. For example, the second-first sub-line 232-1 may be connected with the eighth first-first electrode 210-1.

The second-second sub-line 232-2 may be connected with one of the plurality of first-second electrodes 210-2 located in the second area AA2. The second-second sub-line 232-2 may be connected with the first first-second electrode 210-2.

The plurality of second lines 240 may be electrically connected with the sensor driver TIC. The plurality of second lines 240 may be electrically connected with the plurality of second electrodes 220, respectively. The plurality of second lines 240 may be located in the peripheral area NAA-2. Some of the plurality of second lines 240 may be connected with the plurality of second-first electrodes 220-1, respectively, and the other second lines 240 may be connected with the plurality of second-second electrodes 220-2, respectively.

The guard electrode 251 may be located in the boundary area BA. The guard electrode 251 may be spaced apart from the plurality of first electrodes 210 and the plurality of second electrodes 220. The guard line 252 may be connected with the guard electrode 251. The guard line 252 may be electrically connected with the sensor driver TIC. According to some embodiments of the present disclosure, the guard line 252 may be omitted.

The sensor driver TIC may sequentially output a sensing signal Tx to the plurality of first lines 230.

The sensor driver TIC may provide the same sensing signal Tx to at least two first electrodes 210 connected to the first sub-line 231. For example, the same sensing signal Tx may be provided to the first first-first electrode 210-1 and the eighth first-second electrode 210-2. The at least two first electrodes 210 connected to the first sub-line 231 may share the sensing signal Tx.

The sensor driver TIC may provide the sensing signal Tx to the plurality of first electrodes 210 that are connected to the plurality of second sub-lines 232, respectively. That is, one first line 230 may be connected to each of the first electrodes 210 adjacent to the boundary area BA, and each of the plurality of first electrodes 210 that are connected to the plurality of second sub-lines 232, respectively, may not share the sensing signal Tx with another first electrode 210.

The sensor driver TIC may calculate coordinate information of an input, based on reception signals Rx1 and Rx2 received from the plurality of second lines 240.

The reception signals Rx1 and Rx2 may include the first reception signal Rx1 and the second reception signal Rx2.

The first reception signal Rx1 may be output from the plurality of second-first electrodes 220-1. The first reception signal Rx1 may be generated based on the sensing signal Tx provided by the plurality of first-first electrodes 210-1. The sensor driver TIC may calculate coordinate information of the first area AA1, based on the first reception signal Rx1.

The second reception signal Rx2 may be output from the plurality of second-second electrodes 220-2. The second reception signal Rx2 may be generated based on the sensing signal Tx provided by the plurality of first-second electrodes 210-2. The sensor driver TIC may calculate coordinate information of the second area AA2, based on the second reception signal Rx2.

Unlike that in the present disclosure, the electronic device 1000 constituting a vehicle dashboard may have a relatively large effective area AA (refer to FIG. 2). In this case, the number of electrodes in the sensor layer 200 may be increased, and therefore it may be difficult to drive the sensor layer 200 through one sensor driver. However, according to the prevent disclosure, the plurality of first sub-lines 231 may be connected with at least two first electrodes 210. The sensor driver TIC may transmit the sensing signal Tx to the at least two first electrodes 210 through the first sub-lines 231. The sensor driver TIC may transmit the same sensing signal Tx to a corresponding pair of electrodes among the plurality of first-first electrodes 210-1 and the plurality of first-second electrodes 210-2 through the plurality of first lines 230 and may calculate coordinate information, based on the received reception signals Rx1 and Rx2. The number of sensing signals Tx required for sensing an external input in the sensing area AA-2 may be relatively decreased. The sensor layer 200 may be driven using one sensor driver TIC. Accordingly, the electronic device 1000 in which the area of the ineffective area NAA (refer to FIG. 2) is reduced may be provided.

Unlike in the present disclosure, when the same sensing signal Tx is provided to two first electrodes 210 adjacent to the boundary area BA through the first sub-line 231, an input by the pen PN or a little finger having a relatively narrow contact area with the sensor layer 200 may not be easily recognized in an intermediate area of the sensing area AA-2. For example, when the pen PN is located in an area adjacent to the boundary area BA, the sensor driver TIC that receives the reception signals Rx1 and Rx2 depending on the sensing signal Tx transmitted by the first sub-line 231 may not easily calculate accurate sensing coordinates. However, according to the present disclosure, two first electrodes 210 adjacent to the boundary area BA may receive separate sensing signals Tx through the plurality of second sub-lines 232-2. The sensor driver TIC may easily sense whether the pen PN is sensed in an intermediate area adjacent to the first area AA1 or whether the pen PN is sensed in an intermediate area adjacent to the second area AA2. Accordingly, the electronic device 1000 with improved touch reliability may be provided.

Figure 7:
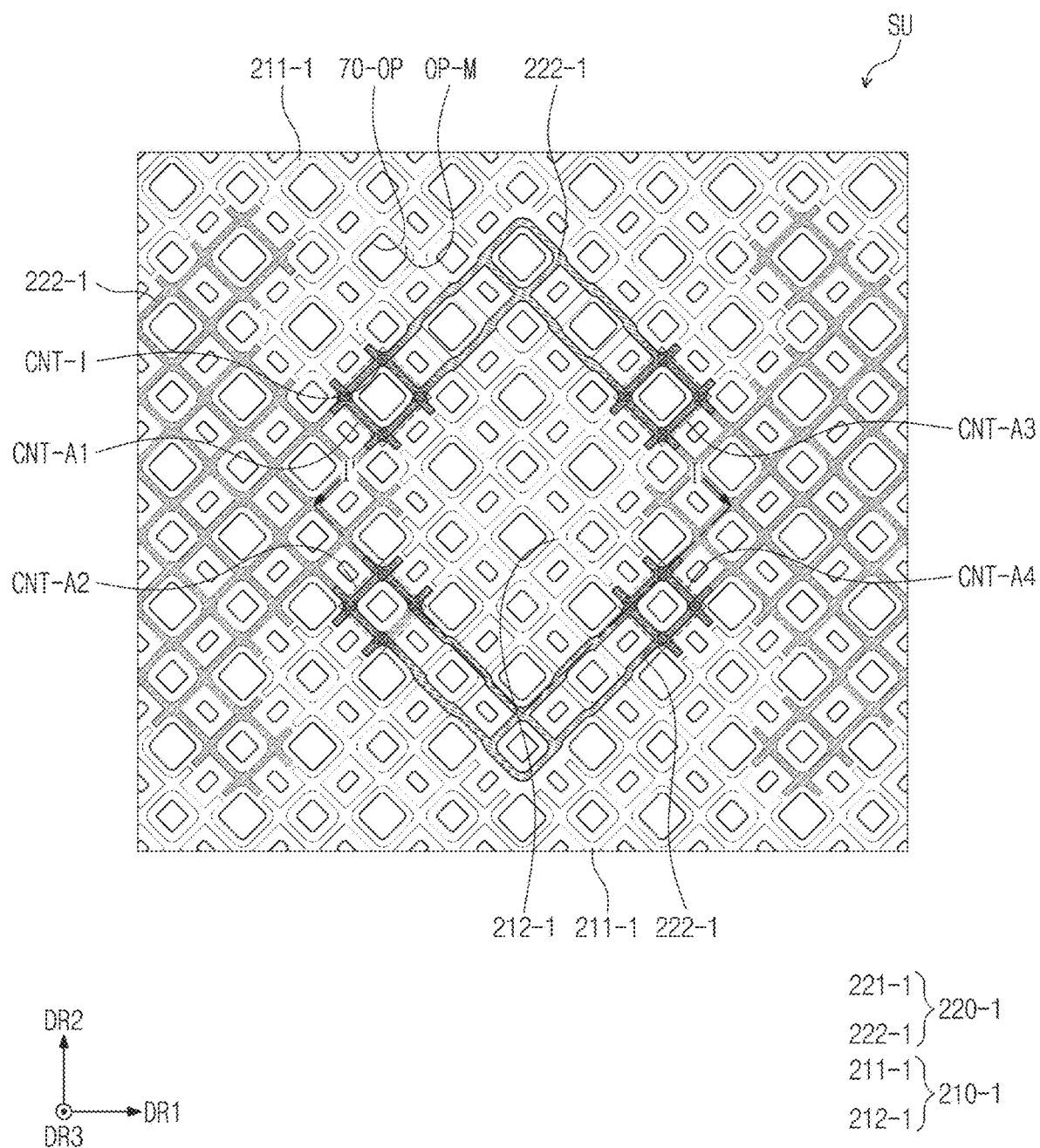
FIG. 7 is an enlarged plan view illustrating one area of FIG. 6 according to some embodiments of the present disclosure.

FIG. 7 is an enlarged plan view illustrating one area of FIG. 6 according to some embodiments of the present disclosure. In describing FIG. 7, the components described with reference to FIG. 6 will be assigned with the identical reference numerals, and descriptions thereabout will be omitted.

Referring to FIG. 7, an intersection area SU may be an area where bridge patterns 222-1 are located.

Each of the plurality of first-first electrodes 210-1 may include a first portion 211-1 and a second portion 212-1. The first portion 211-1 and the second portion 212-1 may have a one-body shape. According to some embodiments, the first portion 211-1 and the second portion 212-1 may be integrally formed such that they are connected to each other.

Each of the plurality of second-first electrodes 220-1 may include a sensing pattern 221-1 and a bridge pattern 222-1. Two sensing patterns 221-1 adjacent to each other may be electrically connected with each other by two bridge patterns 222-1. However, embodiments according to the present disclosure is not particularly limited thereto. The sensing pattern 221-1 may have a mesh structure. An opening OP-M may be defined in the sensing pattern 221-1. One opening OP-M may overlap the opening 70-OP defined in the pixel defining layer 70 (refer to FIG. 4). However, this is illustrative, and one opening OP-M may overlap a plurality of openings 70-OP. Each of the bridge pattern 222-1, the first portion 211-1, and the second portion 212-1 may also have a mesh structure similar to that of the sensing pattern 221-1.

Two bridge patterns 222-1 may connect two sensing patterns 221-1. First to fourth connection areas CNT-A1 to CNT-A4 may be provided between the two bridge patterns 222-1 and the two sensing patterns 221-1. Four contact holes CNT-I may be formed in each of the first to fourth connection areas CNT-A1 to CNT-A4. However, this is illustrative, and two sensing patterns 221-1 may be electrically connected by one bridge pattern. Alternatively, according to some embodiments of the present disclosure, two sensing patterns 221-1 may be electrically connected by three or more bridge patterns.

In FIG. 7, the description has been made based on the plurality of first-first electrodes 210-1 and the plurality of second-first electrodes 220-1. However, each of the plurality of first-second electrodes 210-2 and the plurality of second-second electrodes 220-2 may also have a similar structure.

Figure 8:
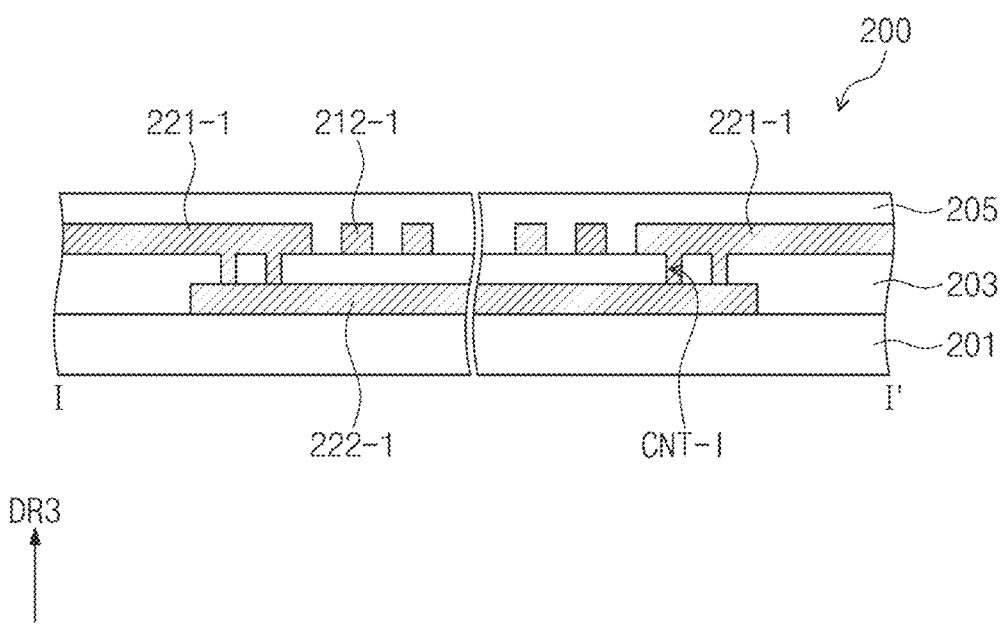
FIG. 8 is a sectional view of a sensor layer taken along line I-I' in FIG. 7 according to some embodiments of the present disclosure.

FIG. 8 is a sectional view of the sensor layer taken along line I-I' in FIG. 7 according to some embodiments of the present disclosure. In describing FIG. 8, the components described with reference to FIGS. 4 and 7 will be assigned with the identical reference numerals, and descriptions thereabout will be omitted.

Referring to FIG. 8, the sensor layer 200 may have a bottom bridge structure. For example, the bridge pattern 222-1 may be included in the first conductive layer 202 (refer to FIG. 4), and the first portion 211-1 (refer to FIG. 7), the second portion 212-1, and the sensing pattern 221-1 may be included in the second conductive layer 204 (refer to FIG. 4).

The bridge pattern 222-1 may be located on the base layer 201.

The sensing insulation layer 203 may be located on the bridge pattern 222-1. The sensing insulation layer 203 may cover the bridge pattern 222-1.

The first portion 211-1 (refer to FIG. 7), the second portion 212-1, and the sensing pattern 221-1 may be located on the sensing insulation layer 203. The first portion 211-1 (refer to FIG. 7), the second portion 212-1, and the sensing pattern 221-1 may be provided in the same layer.

The sensing pattern 221-1 may be connected with the bridge pattern 222-1 through the contact hole CNT-I penetrating the sensing insulation layer 203.

The cover insulation layer 205 may be located on the first portion 211-1 (refer to FIG. 7), the second portion 212-1, and the sensing pattern 221-1. The cover insulation layer 205 may cover the first portion 211-1 (refer to FIG. 7), the second portion 212-1, and the sensing pattern 221-1.

Figure 9:
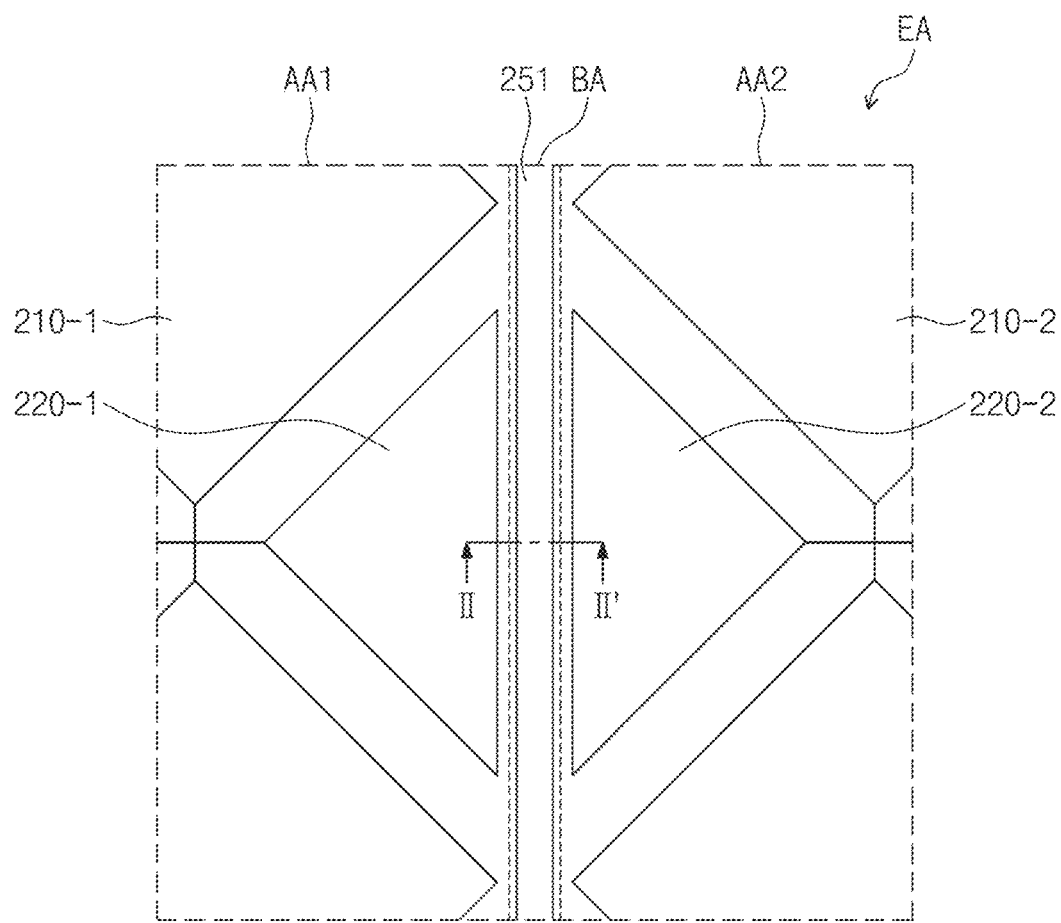
FIG. 9 is an enlarged plan view illustrating one area of FIG. 6 according to some embodiments of the present disclosure.
Figure 10:
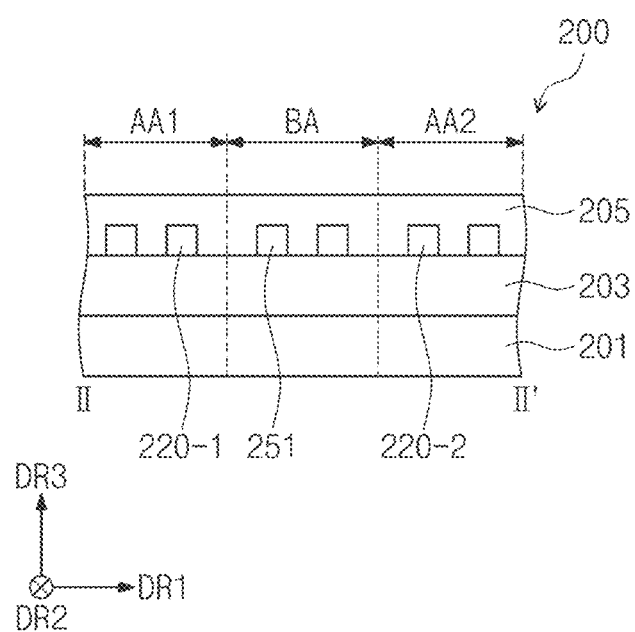
FIG. 10 is a sectional view taken along line II-II' in FIG. 9 according to some embodiments of the present disclosure.

FIG. 9 is an enlarged plan view illustrating one area of FIG. 6 according to some embodiments of the present disclosure, and FIG. 10 is a sectional view taken along the line II-II' in FIG. 9 according to some embodiments of the present disclosure. In describing FIG. 9, the components described with reference to FIG. 6 will be assigned with the identical reference numerals, and descriptions thereabout will be omitted.

Referring to FIGS. 9 and 10, an intermediate area EA may be an area where the guard electrode 251 is located.

The guard electrode 251 may be located between the plurality of first-first electrodes 210-1 and the plurality of first-second electrodes 210-2. The guard electrode 251 may be located between the plurality of second-first electrodes 220-1 and the plurality of second-second electrodes 220-2.

A ground voltage or a guard voltage may be provided to the guard electrode 251 through the guard line 252, or the guard electrode 251 may be in a floated state. The ground voltage may have a voltage level different from that of the guard voltage.

The guard electrode 251 may be located on the sensing insulation layer 203. The guard electrode 251 may be located in the same layer as the second-first electrode 220-1. The guard electrode 251 may be located in the same layer as at least a portion of the second-second electrode 220-2.

The guard electrode 251 may have a mesh structure.

Figure 11:
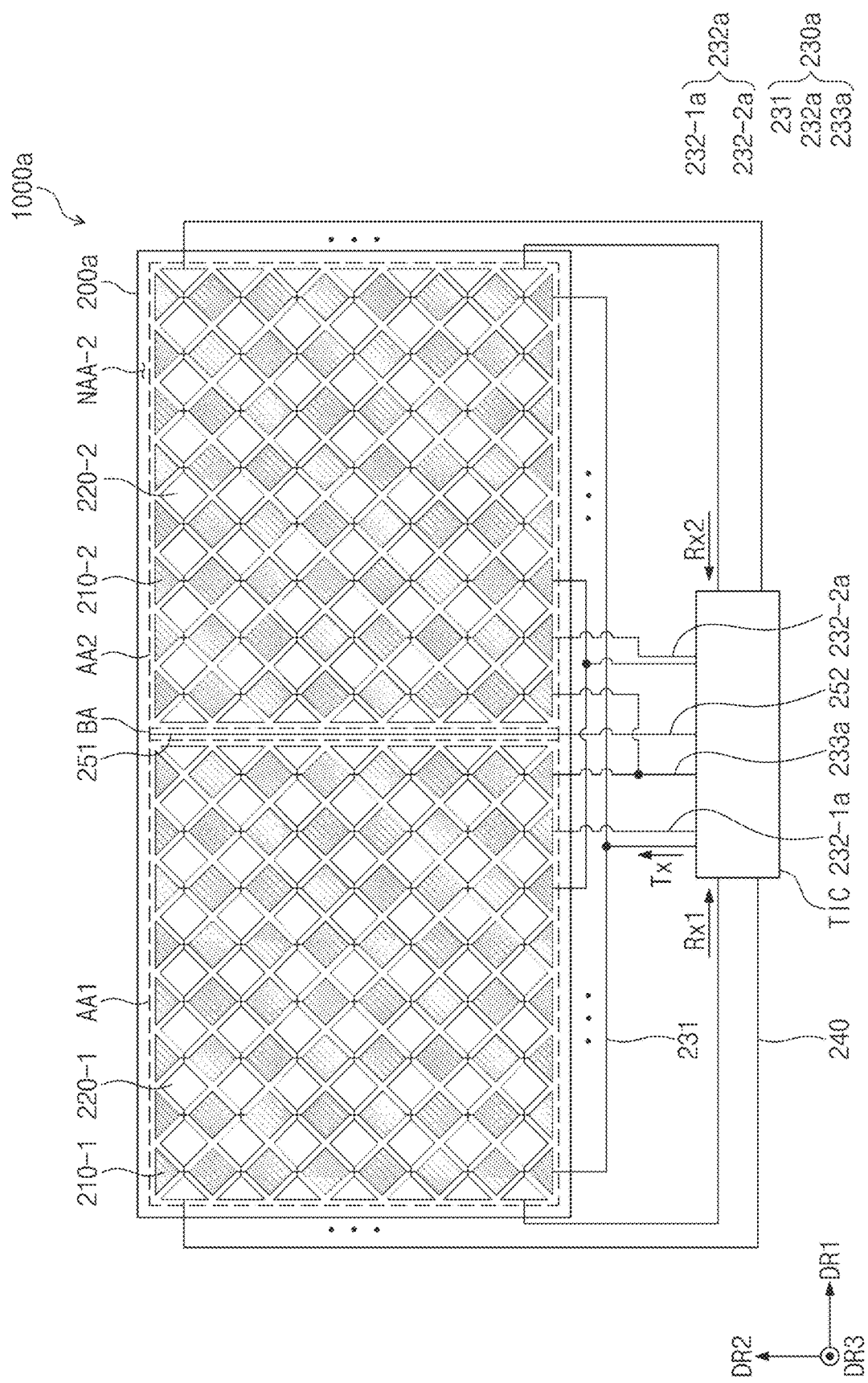
FIG. 11 is a block diagram illustrating a part of an electronic device according to some embodiments of the present disclosure.

FIG. 11 is a block diagram illustrating a part of an electronic device according to some embodiments of the present disclosure. In describing FIG. 11, components identical to the components described with reference to FIG. 6 will be assigned with the identical reference numerals, and descriptions thereabout will be omitted.

Referring to FIG. 11, the electronic device 1000a may include a sensor layer 200a and a sensor driver TIC.

A plurality of first lines 230a may be electrically connected with the sensor driver TIC. The plurality of first lines 230a may include a plurality of first sub-lines 231, a plurality of second sub-lines 232a, and a third sub-line 233a.

Each of the plurality of second sub-lines 232a may be connected to one electrode among a plurality of first-first electrodes 210-1 and a plurality of first-second electrodes 210-2. The plurality of second sub-lines 232a may include a second-first sub-line 232-1a and a second-second sub-line 232-2a.

The second-first sub-line 232-1a may be connected with one of the plurality of first-first electrodes 210-1 located in a first area AA1. The second-first sub-line 232-1a may be connected with the first-first electrode 210-1 that is the second closest to a boundary area BA. For example, the second-first sub-line 232-1a may be connected with the seventh first-first electrode 210-1.

The second-second sub-line 232-2a may be connected with one of the plurality of first-second electrodes 210-2 located in a second area AA2. The second-second sub-line 232-2a may be connected with the first-second electrode 210-2 that is the second closest to the boundary area BA. For example, the second-second sub-line 232-2a may be connected with the second first-second electrode 210-2.

The third sub-line 233a may be located between the plurality of second sub-lines 232a. The third sub-line 233a may be spaced apart from the plurality of first sub-lines 231 with the plurality of second sub-lines 232a therebetween.

The third sub-line 233a may be connected with one of the plurality of first-first electrodes 210-1 and one of the plurality of first-second electrodes 210-2. The third sub-line 233a may be connected with at least two first electrodes 210 adjacent to the boundary area BA. For example, the third sub-line 233a may be connected with the eighth first-first electrode 210-1 and the first first-second electrode 210-2.

The same sensing signal Tx may be provided to the eighth first-first electrode 210-1 and the first first-second electrode 210-2 through the third sub-line 233a.

FIG. 12 is a block diagram illustrating a part of an electronic device according to some embodiments of the present disclosure. In describing FIG. 12, components identical to the components described with reference to FIG. 6 will be assigned with the identical reference numerals, and descriptions thereabout will be omitted.

Referring to FIG. 12, the electronic device 1000b may include a sensor layer 200b and a sensor driver TIC. A first area AA1 and a second area AA2 according to some embodiments of the present disclosure may have different areas. The number of first-first electrodes 210-1 located in the first area AA1 may be different from the number of first-second electrodes 210-2 located in the second area AA2.

A plurality of first lines 230b may be electrically connected with the sensor driver TIC. The plurality of first lines 230b may include a plurality of first sub-lines 231, a plurality of second sub-lines 232b, and a third sub-line 233b.

Each of the plurality of second sub-lines 232b may be connected to one electrode among the plurality of first-first electrodes 210-1 and the plurality of first-second electrodes 210-2. The plurality of second sub-lines 232b may include a second-first sub-line 232-1b and a second-second sub-line 232-2b.

The second-first sub-line 232-1b may be connected with one of the plurality of first-first electrodes 210-1 located in the first area AA1. The second-first sub-line 232-1b may be connected with the first-first electrode 210-1 that is the second closest to a boundary area BA. For example, the second-first sub-line 232-1b may be connected with the seventh first-first electrode 210-1.

The second-second sub-line 232-2b may be connected with one of the plurality of first-second electrodes 210-2 located in the second area AA2. The second-second sub-line 232-2b may be connected with the first-second electrode 210-2 adjacent to the boundary area BA. For example, the second-second sub-line 232-2b may be connected with the first first-second electrode 210-2.

The third sub-line 233b may be located between the plurality of second sub-lines 232b. The third sub-line 233b may be spaced apart from the plurality of first sub-lines 231 with the plurality of second sub-lines 232b therebetween.

The third sub-line 233b may be connected with one of the plurality of first-first electrodes 210-1. The third sub-line 233b may be connected with the last first-first electrode 210-1. For example, the third sub-line 233b may be connected with the eighth first-first electrode 210-1. However, this is illustrative, and the third sub-line 233b according to some embodiments of the present disclosure may be connected with one of the plurality of first-second electrodes 210-2 depending on the position of the boundary area BA.

As described above, two first electrodes adjacent to the boundary area may receive separate sensing signals through the plurality of second sub-lines. The sensor driver may easily sense whether an object, such as a pen or a little finger, which has a relatively small contact area is sensed in an intermediate area adjacent to the first area or in an intermediate area adjacent to the second area. Accordingly, the electronic device with improved touch reliability may be provided.

While the present disclosure has been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. An electronic device comprising:
a display layer;
a sensor layer on the display layer, the sensor layer having a sensing area defined therein, wherein the sensing area includes a first area and a second area spaced apart from the first area in a first direction; and
a sensor driver configured to drive the sensor layer,
wherein the sensor layer includes:
a plurality of first-first electrodes in the first area and arranged in the first direction, each of which extends in a second direction crossing the first direction;
a plurality of second-first electrodes in the first area and arranged in the second direction, each of which extends in the first direction;
a plurality of first-second electrodes in the second area and arranged in the first direction, each of which extends in the second direction;
a plurality of second-second electrodes in the second area and arranged in the second direction, each of which extends in the first direction;
a plurality of first lines connected with the plurality of first-first electrodes and the plurality of first-second electrodes; and
a plurality of second lines connected with the plurality of second-first electrodes and the plurality of second-second electrodes, and
wherein the plurality of first lines include:
a first sub-line connected with one of the plurality of first-first electrodes and one of the plurality of first-second electrodes; and
a second sub-line connected with another one of the plurality of first-first electrodes or another one of the plurality of first-second electrodes.

2. The electronic device of claim 1, wherein the plurality of first-first electrodes cross the plurality of second-first electrodes while being insulated from the plurality of second-first electrodes, respectively, and
wherein the plurality of first-second electrodes cross the plurality of second-second electrodes while being insulated from the plurality of second-second electrodes, respectively.

3. The electronic device of claim 1, wherein the first sub-line includes a plurality of first sub-lines, and
wherein the second sub-line is between the plurality of first sub-lines.

4. The electronic device of claim 1, wherein the first sub-line is connected to at least two electrodes among the plurality of first-first electrodes and the plurality of first-second electrodes, and
wherein the second sub-line is connected to one electrode among the plurality of first-first electrodes and the plurality of first-second electrodes.

5. The electronic device of claim 1, wherein the sensing area further includes a boundary area between the first area and the second area, and
wherein the sensor layer further includes a guard electrode in the boundary area.

6. The electronic device of claim 5, wherein a ground voltage is provided to the guard electrode.

7. The electronic device of claim 5, wherein the guard electrode is in a floated state.

8. The electronic device of claim 5, wherein the second sub-line is connected with an electrode adjacent to the guard electrode among the plurality of first-first electrodes and the plurality of first-second electrodes.

9. The electronic device of claim 1, wherein the plurality of first lines and the plurality of second lines are electrically connected with the sensor driver.

10. The electronic device of claim 1, wherein the plurality of first lines further include a third sub-line spaced apart from the first sub-line with the second sub-line therebetween.

11. The electronic device of claim 10, wherein the third sub-line is connected with another one of the plurality of first-first electrodes and another one of the plurality of first-second electrodes.

12. The electronic device of claim 10, wherein the third sub-line is connected with another one of the plurality of first-first electrodes or another one of the plurality of first-second electrodes.

13. The electronic device of claim 12, wherein a number of first lines connected to the first area is different from a number of first lines connected to the second area.

14. An electronic device comprising:
a display layer;
a sensor layer on the display layer, the sensor layer having a sensing area defined therein, wherein the sensing area includes a first area and a second area spaced apart from the first area in a first direction; and a sensor driver configured to drive the sensor layer, wherein the sensor layer includes:

a plurality of first electrodes in the first area and the second area;

a plurality of second electrodes in the first area and the second area and configured to cross the plurality of first electrodes while being insulated from the plurality of first electrodes, respectively;

a plurality of first sub-lines, each of which is connected with at least two first electrodes among the plurality of first electrodes;

a plurality of second sub-lines, each of which is connected with one first electrode among the plurality of first electrodes; and a plurality of second lines electrically connected with the plurality of second electrodes, respectively.

15. The electronic device of claim 14, wherein each of the plurality of second sub-lines is between the plurality of first sub-lines.

16. The electronic device of claim 14, wherein the sensing area further includes a boundary area between the first area and the second area, and wherein the sensor layer further includes a guard electrode in the boundary area.

17. The electronic device of claim 16, wherein the plurality of second sub-lines are connected with a first electrode adjacent to the guard electrode among the plurality of first electrodes.

18. The electronic device of claim 16, wherein the sensor layer further includes a third sub-line between the plurality of second sub-lines.

19. The electronic device of claim 18, wherein the third sub-line is connected with first electrodes spaced apart from each other with the guard electrode therebetween among the plurality of first electrodes.

20. The electronic device of claim 18, wherein the third sub-line is connected with one first electrode adjacent to the guard electrode among the plurality of first electrodes.

* * * * *